United States Patent
Andoh

(10) Patent No.: US 8,731,758 B2
(45) Date of Patent: May 20, 2014

(54) VEHICLE CONTROL APPARATUS, CONTROL METHOD THEREOF, AND CONTROL SOFTWARE

(75) Inventor: Fukashi Andoh, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/635,842

(22) PCT Filed: Apr. 6, 2010

(86) PCT No.: PCT/JP2010/002513
§ 371 (c)(1),
(2), (4) Date: Sep. 18, 2012

(87) PCT Pub. No.: WO2011/125119
PCT Pub. Date: Oct. 13, 2011

(65) Prior Publication Data
US 2013/0013142 A1     Jan. 10, 2013

(51) Int. Cl.
*B60L 9/00*     (2006.01)
*B62K 3/00*     (2006.01)
*B60L 11/00*     (2006.01)
*B60W 10/08*     (2006.01)

(52) U.S. Cl.
CPC ............... *B62K 3/007* (2013.01); *B60L 11/002* (2013.01); *B60W 10/08* (2013.01); *B60L 11/00* (2013.01)
USPC ................. 701/22; 701/49; 701/54; 701/110; 180/218

(58) Field of Classification Search
CPC ...... B60L 11/00; B60L 11/002; B60W 10/08; B62K 3/007
USPC .......................... 701/22, 49, 54, 110; 180/218
See application file for complete search history.

(56) References Cited

U.S. PATENT DOCUMENTS 7,192,040 B2 *  3/2007  Xie ........................... 280/93.502
7,962,256 B2 *  6/2011  Stevens et al. .................. 701/22

(Continued)

FOREIGN PATENT DOCUMENTS

JP     11-500331 A     1/1999
JP     2008-056169 A     3/2008

(Continued)

OTHER PUBLICATIONS

International Search Report of PCT/JP2010/002513 mailed Jul. 20, 2010.

*Primary Examiner* — Calvin Cheung
(74) *Attorney, Agent, or Firm* — Kenyon & Kenyon LLP

(57) ABSTRACT

A vehicle control apparatus includes state measurement means for measuring states of the vehicle; required power estimation means for calculating an estimated required power indicating a motor power required to operate the vehicle based on the states of the vehicle measured by the state measurement means; critical power estimation means for calculating a critical power when the motor power saturates based on the states of the vehicle measured by the state measurement means; modified reference input means for modifying a reference input so that the estimated required power falls within the estimated critical power when it is determined that the estimated required power estimated by the required power estimation means exceeds the estimated critical power estimated by the critical power estimation means; and control means for controlling a motor of the vehicle based on the reference input modified by the modified reference input means.

15 Claims, 6 Drawing Sheets

(56) References Cited

U.S. PATENT DOCUMENTS

| | | | |
|---|---|---|---|
| 8,428,788 B2* | 4/2013 | Takenaka et al. | 701/1 |
| 8,467,941 B2* | 6/2013 | Field et al. | 701/49 |
| 2004/0098185 A1* | 5/2004 | Wang | 701/70 |
| 2009/0078485 A1* | 3/2009 | Gutsch et al. | 180/218 |
| 2010/0070132 A1* | 3/2010 | Doi | 701/36 |
| 2010/0071984 A1* | 3/2010 | Doi et al. | 180/218 |
| 2010/0121538 A1* | 5/2010 | Ishii et al. | 701/48 |
| 2010/0126787 A1* | 5/2010 | Kawada | 180/21 |
| 2010/0305841 A1* | 12/2010 | Kajima et al. | 701/124 |
| 2011/0071715 A1* | 3/2011 | Akimoto et al. | 701/22 |
| 2011/0221160 A1* | 9/2011 | Shaw | 280/205 |
| 2011/0264350 A1* | 10/2011 | Doi | 701/90 |
| 2012/0166056 A1* | 6/2012 | Akimoto et al. | 701/93 |
| 2012/0168235 A1* | 7/2012 | Gomi et al. | 180/21 |

FOREIGN PATENT DOCUMENTS

| | | |
|---|---|---|
| JP | 2008-247136 A | 10/2008 |
| JP | 2009-083754 A | 4/2009 |
| JP | 2009-245246 A | 10/2009 |

\* cited by examiner

VEHICLE CONTROL APPARATUS, CONTROL METHOD THEREOF, AND CONTROL SOFTWARE

This is a 371 national phase application of PCT/JP2010/002513 filed 6 Apr. 2010, the contents of which are incorporated herein by reference.

TECHNICAL FIELD

The present invention relates to a vehicle control apparatus, a control method thereof, and a control software that control an inverted vehicle travelling while performing an inverted control.

BACKGROUND ART

It is important to allow an inverted vehicle travelling while keeping an inverted state to safely continue travelling even when sufficient motor power cannot be provided due to a failure of an electric system or the like. A vehicle control apparatus is known, for example, to contact a safety wheel to the ground to prevent an overturn when speed of the inverted vehicle is abruptly reduced because of a failure of an electric system (see Patent literature 1).

CITATION LIST

Patent Literature

[Patent Literature 1]
Japanese Unexamined Patent Application Publication No. 2008-247136

SUMMARY OF INVENTION

Technical Problem

However, the vehicle control apparatus shown in the above Patent literature 1 cannot continue travelling since a safety wheel is contacted to the ground when motor power is reduced due to a failure or the like, for example. Meanwhile, a vehicle control apparatus is desired that can continue the inverted control with available motor power without using a safety wheel even when motor power cannot be sufficiently maintained due to such a failure.

The present invention has been made in order to solve the above-mentioned problem, and aims to provide a vehicle control apparatus, a control method thereof, and a control software that can continue the inverted control with available motor power even when sufficient motor power of the vehicle cannot be provided.

Solution to Problem

An exemplary aspect of the present invention to accomplish the exemplary object is a vehicle control apparatus for controlling a motor that drives a wheel of a vehicle to perform an inverted control of the vehicle, the vehicle control apparatus including: state measurement means for measuring states of the vehicle; required power estimation means for calculating an estimated required power indicating a motor power required to operate the vehicle based on the states of the vehicle measured by the state measurement means; critical power estimation means for estimating a critical power when the motor power is saturated based on the states of the vehicle measured by the state measurement means; reference input modification means for modifying a reference input so that the estimated required power falls within the estimated critical power when it is determined that the estimated required power estimated by the required power estimation means exceeds the estimated critical power estimated by the critical power estimation means; and control means for controlling a motor of the vehicle based on the reference input modified by the reference input modification means.

In this aspect, the state measurement means may detect a load angle indicating an inclination of the vehicle, the vehicle control apparatus may further include reference input means for receiving a load angle reference input indicating a travelling instruction of the vehicle, and the control means may control the vehicle so that the load angle measured by the state measurement means follows the load angle reference input from the reference input means.

Further, in this aspect, the critical power estimation means may calculate power consumed by the motor based on a torque reference input of the motor received from the control means and the states received from the state measurement means, and when the power consumed by the motor saturates, output it as the estimated critical power.

Further, in this aspect, the required power estimation means may calculate the estimated required power required to operate the vehicle according to the load angle reference input from the reference input means as a polynomial expression of the load angle reference input based on the states received from the state measurement means.

Furthermore, in this aspect, the vehicle control apparatus may further include: estimation means for a first order derivative of required power for calculating a first order derivative of the estimated required power as a polynomial of the load angle reference input based on the states received from the state measurement means; and discriminant means for calculating a discriminant value to discriminate the first order derivative of the estimated required power based on the states received from the state measurement means.

Furthermore, in this aspect, the reference input modification means may calculate the modified load angle reference input by modifying the load angle reference input based on a sign of the first order derivative of the estimated required power from the estimation means for the first order derivative of required power, and the discriminant value received from the discriminant means when it is determined that the estimated required power based on the load angle reference input received from the reference input means exceeds the estimated critical power, so that the estimated required power falls within the estimated critical power and the control means may perform an inverted control so that the load angle of the vehicle tracks the modified load angle reference input that is modified.

Moreover, in this aspect, the modified reference input means may perform the following processing of: (a) modifying the load angle reference input with a specified increment having a sign opposite to a product of a sign of the first order derivative of the estimated required power and a sign of the estimated required power when it is determined that the estimated required power exceeds the estimated critical power, the sign of the discriminant value is negative or 0, and the first order derivative of the estimated required power is not 0; (b) modifying the load angle reference input with a specified increment having a sign opposite to a product of a sign of the estimated required power and a sign of the first order derivative of the estimated required power with a varied load angle reference input wherein an infinitesimal angle is added to the load angle reference input when it is determined that the estimated required power exceeds the estimated critical power, a sign of the discriminant value is negative or 0, and the first order derivative of the estimated required power is 0; (c) modifying the load angle reference input with a specified increment having a sign opposite to a product of a sign of the estimated required power and a sign of the first order derivative of the estimated required power with the load angle reference input when it is determined that the estimated required power exceeds the estimated critical power, a sign of the discriminant value is positive, and the first order derivative of the estimated required power is not 0; and (d) modifying the load angle reference input with a modification amount having a sign opposite to a sign of the load angle reference input when it is determined that the estimated required power exceeds the estimated critical power, the sign of the discriminant value is positive, and the first order derivative of the estimated required power is 0.

Moreover, in this aspect, the control means may perform an inverted control so that the load angle of the vehicle tracks the load angle reference input by the reference input means when it is determined by the modified reference input means that the estimated required power based on the load angle reference received from the reference input means falls within the estimated critical power.

In this aspect, the state measurement means may include a state measurement unit for measuring the states of the vehicle as a measured state, and a state observation unit for estimating estimated states which are estimation values of the measured states based on the measured states obtained by the state measurement unit.

Further, in this aspect, the estimated required power may be a time-variant four-dimensional polynomial of the load angle reference input.

Furthermore, in this aspect, the state measurement means may measure at least one of a load angle, a load speed, a load acceleration, and a wheel angle of the vehicle.

Moreover, in this aspect, the vehicle control apparatus may further include reference input modification means for supplying one of the load angle reference input from the reference input means and a modified load angle reference input modified by the modified reference input means to the control means according to an instruction from the modified reference input means, wherein the control means may control the motor of the vehicle so that the load angle of the vehicle tracks the load angle reference input and the modified load angle reference input output from the reference input modification means.

Another exemplary aspect of the present invention to accomplish the above exemplary object may be a control method of a vehicle control apparatus for controlling a motor that drives a wheel of a vehicle to perform an inverted control of the vehicle, the method including the following steps of: measuring states of the vehicle; calculating an estimated required power that is a motor power required to operate the vehicle based on the measured states of the vehicle; estimating a critical power when the motor power saturates based on the measured states of the vehicle; modifying a reference input so that the estimated required power falls within the estimated critical power when it is determined that the estimated required power that is estimated exceeds the estimated critical power that is estimated; and controlling a motor of the vehicle based on the modified reference input.

Further, an exemplary aspect of the present invention to accomplish the exemplary object may be a control software of a vehicle control apparatus for controlling a motor that drives a wheel of a vehicle to perform an inverted control of the vehicle, the control software causing a computer to execute the following processing of: measuring states of the vehicle; calculating an estimated required power that is a motor power required to operate the vehicle based on the measured states of the vehicle; estimating a critical power when the motor power saturates based on the measured states of the vehicle; modifying a reference input so that the estimated required power falls within the estimated critical power when it is determined that the estimated required power that is estimated exceeds the estimated critical power that is estimated; and controlling a motor of the vehicle based on the modified reference input.

Furthermore, one exemplary aspect of the present invention to accomplish the exemplary object may be a vehicle control apparatus for controlling a motor that drives a wheel of a vehicle to perform an inverted control of the vehicle, the vehicle control apparatus including: a sensor for measuring states of the vehicle; a required power estimation unit for calculating an estimated required power that is a motor power required to operate the vehicle based on the states of the vehicle measured by the sensor; a critical power estimation unit for estimating a critical power when the motor power saturates based on the states of the vehicle measured by the sensor; a modified reference input unit for modifying a reference input so that the estimated required power falls within the estimated critical power when it is determined that the estimated required power obtained by the required power estimation unit exceeds the estimated critical power obtained by the critical power estimation unit; and a control unit for controlling a motor of the vehicle based on the reference input modified by the modified reference input unit.

Advantageous Effects of Invention

According to the present invention, it is possible to provide a vehicle control apparatus, a control method thereof, and a control software that are capable of continuing an inverted control with motor power that is available to a vehicle.

DESCRIPTION OF EMBODIMENTS

Hereinafter, an exemplary embodiment of the present invention will be described with reference to the drawings. A vehicle control apparatus according to the exemplary embodiment of the preset invention is capable of continuing travelling within a critical power when available motor power is reduced due to a failure in an electric system or the like, for example, in an inverted vehicle 100 that performs desired travelling while performing an inverted control to keep an inverted state.

Figure 1:
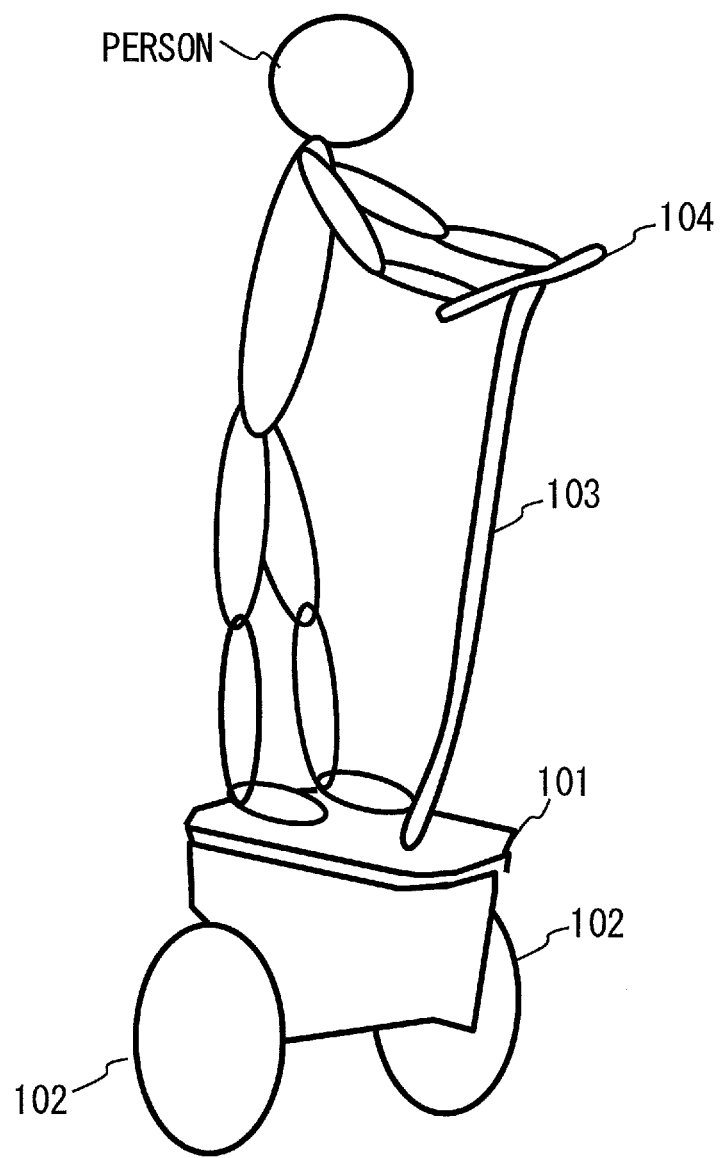
FIG. 1 is an oblique view showing a schematic configuration of an inverted vehicle according to an exemplary embodiment of the present invention.

The inverted vehicle 100 is configured as a coaxial two-wheel vehicle including, as shown in FIG. 1 for example, a platform 101 on which a load including a person or a burden is mounted, a pair of wheels 102 rotatably provided to the platform 101 and driven by a pair of motors, a handle 103 operably provided in the platform 101, and a grip 104 connected to the handle 103 and held by a person, for example. The application of the present invention is not limited to this example but covers any type of vehicle that travels while keeping an inverted state.

Figure 2:
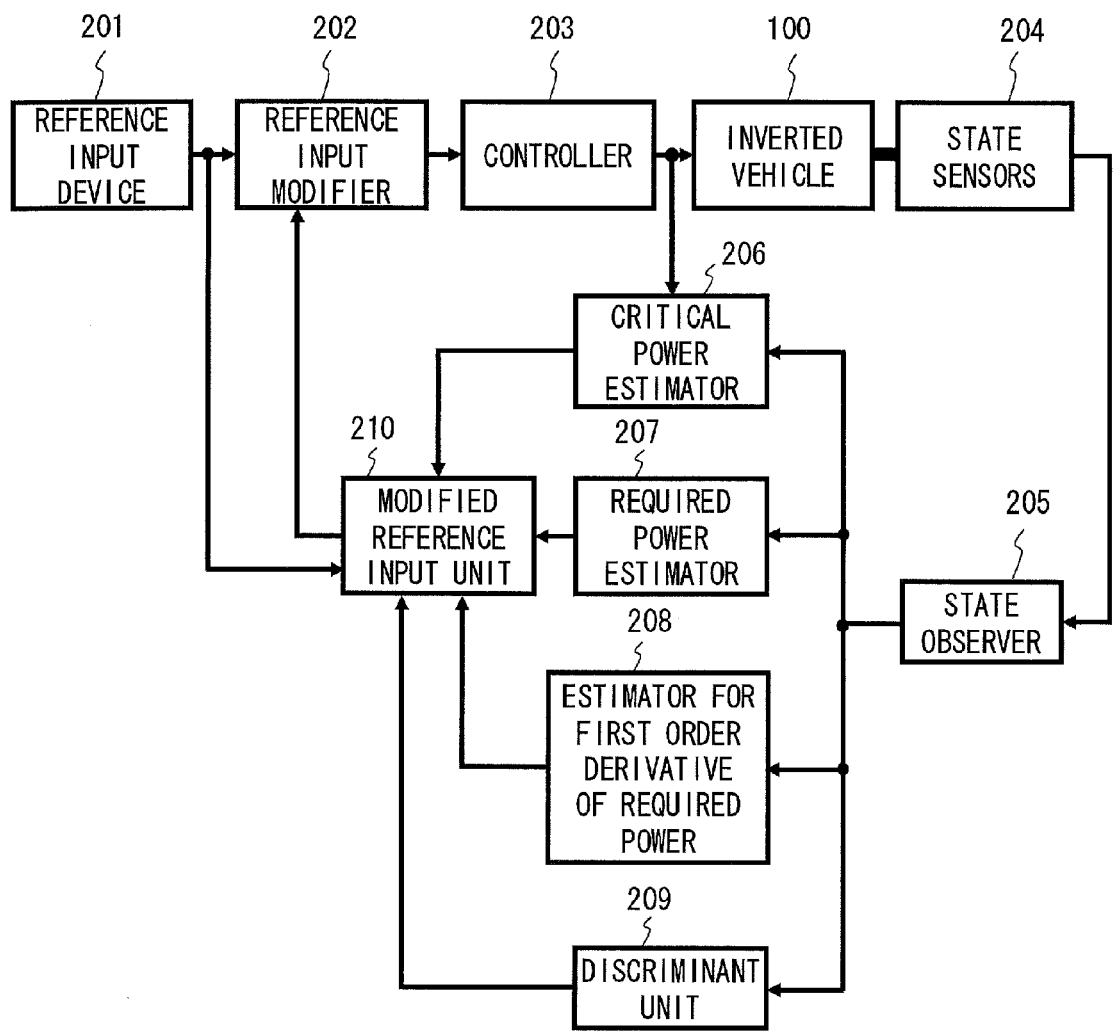
FIG. 2 is a block diagram showing a schematic system configuration of a vehicle control apparatus according to the exemplary embodiment of the present invention.

FIG. 2 is a block diagram showing a schematic system configuration of the vehicle control apparatus according to the exemplary embodiment of the present invention. A vehicle control apparatus 200 according to the exemplary embodiment includes a reference input device 201, a reference input modifier 202, a controller 203, state sensors 204, a state observer 205, a critical power estimator 206, a required power estimator 207, an estimator for the first order derivative of required power 208, a discriminant unit 209, and a modified reference input unit 210.

The reference input device 201 is one specific example of reference input means. The reference input device 201 receives a load angle reference input $\theta_{1r}$ according to a load angle $\theta_1$ input in accordance with travelling manipulation (e.g., manipulation to tilt the platform 101 or the handle 103 of the inverted vehicle 100 in a forward direction or backward direction) of the inverted vehicle 100 by a rider. The reference input device 201 supplies the received load angle reference input $\theta_{1r}$ to the reference input modifier 202 and the modified reference input unit 210.

The reference input modifier 202 is one specific example of reference input modification means. Upon receiving a first reference signal that will be described below from the modified reference input unit 210, the reference input modifier 202 supplies the load angle reference input $\theta_{1r}$ received from the reference input device 201 to the controller 203. Further, upon receiving a second reference signal that will be described below from the modified reference input unit 210, the reference input modifier 202 supplies a modified load angle reference input $\theta_{1r}+\Delta\theta_{1r}$ received from the modified reference input unit 210 to the controller 203.

The controller 203 is one specific example of control means, and performs a feedback control of the motors that drive the wheels 102 of the inverted vehicle 100 so that the load angle $\theta_1$ of the inverted vehicle 100 tracks the load angle reference input $\theta_{1r}$ or the modified load angle reference input $\theta_{1r}+\Delta\theta_{1r}$ received from the reference input modifier 202.

The state sensors 204 are one specific example of a state measurement unit. The state sensors 204 measure a load angle, a load speed, a load acceleration, and a wheel speed of the inverted vehicle 100 using sensors including an angular sensor, a wheel speed sensor, an acceleration sensor, and an inclination sensor provided in the inverted vehicle 100, and supply the measured quantities to the state observer 205 as the measured states.

The state observer 205 is one specific example of a state observation unit. The state observer 205 calculates estimated states including an estimated load angle, an estimated load speed, an estimated load acceleration, an estimated wheel speed that are estimation values of each measured state based on the measured states including the load angle, the load speed, the load acceleration, and the wheel speed received from the state sensors 204, and supplies the estimated states to the critical power estimator 206, the required power estimator 207, the estimator for the first order derivative of required power 208, and the discriminant unit 209, respectively.

The critical power estimator 206 is one specific example of critical power estimation means. The critical power estimator 206 calculates the power consumed by the motor using equation (9) below, for example, based on a torque reference input of the motor received from the controller 203 and the estimated states received from the state observer 205. On the saturation of the calculated power, the critical power estimator 206 supplies this calculated quantity to the modified reference input unit 210 as an estimated critical power $P_{lim}$.

The required power estimator 207 is one specific example of required power estimation means. The required power estimator 207 calculates an estimated required power $p(\theta_{1r})$ required to operate the inverted vehicle 100 with respect to the load angle reference input $\theta_{1r}$ from the reference input device 201 based on the estimated state received from the state observer 205 as a polynomial expression of the load angle reference input $\theta_{1r}$ using equation (17) below, and supplies the estimated required power to the modified reference input unit 210.

The estimator for the first order derivative of required power 208 is one specific example of estimation means for the first order derivative of required power. The estimator for the first order derivative of required power 208 calculates the first order derivative of an estimated required power (hereinafter referred to as an estimated first order derivative of required power) as a polynomial of the load angle reference input $\theta_{1r}$ using equation (20) below based on the estimated states received from the state observer 205, and supplies the estimated first order derivative of required power to the modified reference input unit 210.

The discriminant unit 209 is one specific example of discriminant means. The discriminant unit 209 calculates a discriminant value $\Delta$ to discriminate the estimated first order derivative of required power based on the estimated state received from the state observer 205 using equation (21) below, and supplies the discriminant value to the modified reference input unit 210.

The modified reference input unit 210 is one specific example of modified reference input means. When the estimated required power $p(\theta_{1r})$ based on the load angle reference input $\theta_{1r}$ received from the reference input device 201 falls within the estimated critical power $P_{lim}$ based on the load angle reference input $\theta_{1r}$ received from the reference input device 201, the estimated critical power $P_{lim}$ received from the critical power estimator 206, and the estimated required power $p(\theta_{1r})$ received from the required power estimator 207, the modified reference input unit 210 supplies a first reference signal indicating that the estimated required power falls within the estimated critical power to the reference input modifier 202.

Meanwhile, when the estimated required power $p(\theta_{1r})$ based on the load angle reference input $\theta_{1r}$ received from the reference input device 201 exceeds the estimated critical power $P_{lim}$ based on the load angle reference input $\theta_{1r}$ received from the reference input device 201, the estimated critical power $P_{lim}$ received from the critical power estimator 206, and the estimated required power $p(\theta_{1r})$ received from the required power estimator 207, the modified reference input unit 210 calculates a modified load angle reference input $\theta_{1r}+\Delta\theta_{1r}$ wherein the load angle reference input $\theta_{1r}$ is modified so that the estimated required power falls within the estimated critical power $P_{lim}$ based on a sign of the estimated first order derivative of required power received from the estimator for the first order derivative of required power 208 and the discriminant value Δ received from the discriminant unit 209. The modified reference input unit 210 then supplies the modified load angle reference $\theta_{1r}+\Delta\theta_{1r}$ that is calculated and a second reference signal indicating that the estimated required power exceeds the estimated critical power to the reference input modifier 202.

Note that the vehicle control apparatus 200 is configured in hardware with a microcomputer including, for example, a central processing unit (CPU) performing control processing, computing processing or the like, a read only memory (ROM) storing a computing software, a control software or the like executed by the CPU, a random access memory (RAM) storing processed data or the like.

Figure 3:
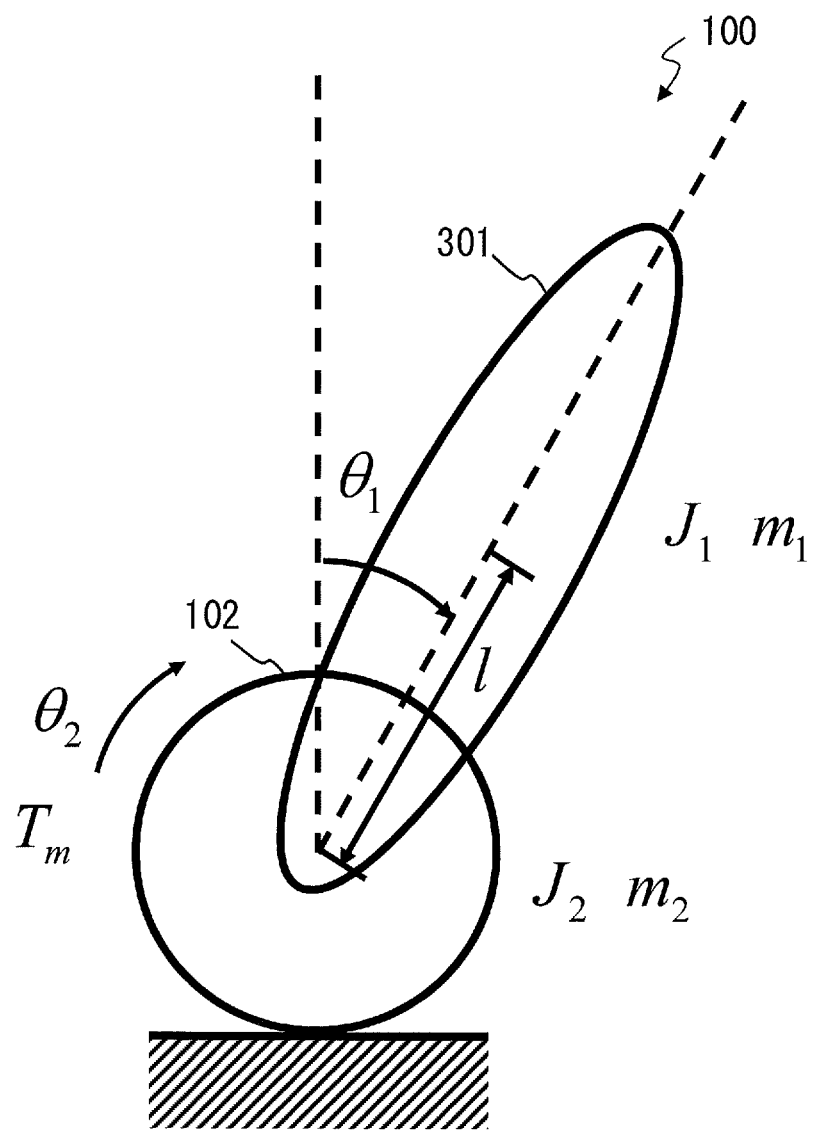
FIG. 3 is a side view schematically showing the inverted vehicle according to the exemplary embodiment of the present invention.

Next, an example of more specific processing in the vehicle control apparatus 200 will be described in detail. FIG. 3 is a side view schematically showing the inverted vehicle in FIG. 1. In the inverted vehicle 100, as in FIG. 3, for example, a load 301 is rotatably connected to the pair of wheels 102 coaxially arranged and driven by motors. Thus, the inverted vehicle 100 is configured to travel in a desired speed while maintaining the inverted state of the load 301.

Now, an equation of motion of the inverted vehicle 100 in FIG. 3 will be described in detail. The following equation of motion (1) is derived using a known method of analytical dynamics. First, a kinetic energy T and a potential energy V can be expressed as equations (1) and (2), respectively.

$$T = \frac{1}{2}m_1\left[(r\dot{\theta}_2 + l\cos\theta_1\dot{\theta}_1)^2 + (-l\sin\theta_1\dot{\theta}_1)^2\right] + \frac{1}{2}J_1\dot{\theta}_1^2 + \frac{1}{2}m_2(r\dot{\theta}_2)^2 + \frac{1}{2}J_2\dot{\theta}_2^2 \quad (1)$$

$$V = m_1 g l \cos\theta_1 - m_1 \ddot{y}_2 l \cos\theta_1 \quad (2)$$

Meanings of symbols in equations (1) and formula (2) are as follows.
$m_1$: mass of the load 301;
$J_1$: inertia moment of the load 301;
$m_2$: mass of the wheels 102;
$J_2$: inertia moment of the wheels 102;
$\ddot{y}_2$: normal acceleration of the wheels;
l: distance between a center of gravity of the load 301 and the axle;
r: radius of the wheels 102; and
g: gravitational acceleration.

Further, calculating Lagrangian L=T−V using equations (1) and (2) and using the Euler-Lagrange equation, the above equation of motion can be expressed as equations (3) and (4).

$$(m_1 l^2 + J_1)\ddot{\theta}_1 + m_1 r l \cos\theta_1 \ddot{\theta}_2 - m_1 g l \sin\theta_1 = -T_m \quad (3)$$

In equation (3), $T_m$ denotes a motor torque.

$$(m_1 r l \cos\theta_1 + J_1 + m_1 l^2)\ddot{\theta}_1 + (r m_1 l \cos\theta_1 + J_2 + m_2 r^2 + m_1 r^2)\ddot{\theta}_2 - m_1 l r \dot{\theta}_1^2 \sin\theta_1 - m_1 g l \sin\theta_1 = 0 \quad (4)$$

Described next in detail is a method of modifying the load angle reference input $\theta_{1r}$ to keep the inverted state while preventing an overturn when the motor power is reduced due to a failure in a part of an amplifier or a battery of the inverted vehicle 100.

First, eliminating the wheel angle $\theta_2$ from equations (3) and (4) above yields equation (5).

$$\ddot{\theta}_1 + f(\theta_1, \dot{\theta}_1) = g(\theta_1)T_m \quad (5)$$

-continued $$f(\theta_1, \dot{\theta}_1) = \frac{b_2 c_1 - b_1 c_2}{a_1 b_2 - a_2 b_1}, \quad g(\theta_1) = \frac{-b_2}{a_1 b_2 - a_2 b_1}$$

$$a_1 = m_1 l^2 + J_1, \quad b_1 = m_1 r l \cos\theta_1 \approx m_1 r l$$

$$c_1 = -m_1 g l \sin\theta_1 \approx -m_1 g l \theta_1,$$

$$a_2 = m_1 r l \cos\theta_1 + J_1 + m_1 l^2 \approx m_1 r l + J_1 + m_1 l^2,$$

$$b_2 = r m_1 l \cos\theta_1 + J_2 + m_2 r^2 + m_1 r^2$$
$$\approx r m_1 l + J_2 + m_2 r^2 + m_1 r^2,$$

$$c_2 = -m_1 l r \dot{\theta}_1^2 \sin\theta_1 - m_1 g l \sin\theta_1$$
$$\approx -m_1 l r \dot{\theta}_1^2 \theta_1 - m_1 g l \theta_1$$

It is assumed, in the equation (5), that the load angle operates in a range of $|\theta_1| \ll \pi/2$[rad]. Similarly, eliminating the load angle $\theta_1$ from the equations (3) and (4) above yields equation (6) below.

$$\ddot{\theta}_2 + h(\theta_1) = k(\theta_1)T_m \quad (6)$$

$$h(\theta_1) = \frac{a_2 c_1 - a_1 c_2}{a_2 b_1 - a_1 b_2}, \quad k(\theta_1) = \frac{-a_2}{a_2 b_1 - a_1 b_2}$$

In equations (5) and (6), $f(\bullet, \bullet)$, $g(\bullet)$, $h(\bullet)$, and $k(\bullet)$ are nonlinear functions. Further, solving equation (5) for the motor torque $T_m$ yields equation (7).

$$T_m = \frac{\ddot{\theta}_1 + f(\theta_1, \dot{\theta}_1)}{g(\theta_1)} \quad (7)$$

$$= \frac{(a_1 b_2 - a_2 b_1)\ddot{\theta}_1 + b_2 c_1 - b_1 c_2}{-b_2}$$

Further, the motor angular speed (wheel speed) can be expressed as equation (8) using equations (5) and (6) above.

$$\dot{\theta}_2 = \int_0^\tau \left(-\frac{a_2}{b_2}\ddot{\theta}_1 - \frac{c_2}{b_2}\right)dt \quad (8)$$

Furthermore, the motor power $P(\theta_1)$ can be expressed as equation (9) using equations (7) and (8) above.

$$p(\theta_1) = \dot{\theta}_2 T_m \quad (9)$$

$$= \int_0^\tau \left(-\frac{a_2}{b_2}\ddot{\theta}_1 - \frac{c_2}{b_2}\right)dt \frac{(a_1 b_2 - a_2 b_1)\ddot{\theta}_1 + b_2 c_1 - b_1 c_2}{-b_2}$$

$$\approx \left(-\frac{a_2}{b_2}\dot{\theta}_1 - \frac{1}{b_2}\int_0^\tau c_2 \, dt\right)\frac{(a_1 b_2 - a_2 b_1)\ddot{\theta}_1 + b_2 c_1 - b_1 c_2}{-b_2}$$

It is assumed, in equation (9), that each of $a_1$, $b_1$, $a_2$, and $b_2$ can be approximated to a predetermined value when the load angle is in a range of $|\theta_1| \ll \pi/2$[rad]. The critical power estimator 206 calculates the power consumed by the motor using equation (9), for example.

Derivation is given for the motor power required to make the load angle $\theta_1$ track the load angle reference input $\theta_{1r}$ by the controller 203 at a predetermined time t=k×T[s], is given in what follows where T denotes a sampling time and k denotes a predetermined natural number. The load speed and the load acceleration can be approximated as equations (10) and (11) using the estimated load angle and the estimated load speed, respectively.

$$\dot{\theta}_{1r} \approx \frac{\theta_{1r}(k) - \hat{\theta}_1(k-1)}{T} \quad (10)$$

$$\ddot{\theta}_{1r} \approx \frac{\theta_{1r}(k) - \hat{\theta}_1(k-1)}{T^2} - \frac{\dot{\hat{\theta}}_1(k-1)}{T} \quad (11)$$

In equations (10) and (11), the parentheses after symbols indicate the timed steps. For example, $\theta_{1r}(k)$ indicates a value of $\theta_{1r}$ at t=k×T[s]. Shown below is a method of calculating the estimated load angle and the estimated load speed in the above equations (10) and (11).

For example, the state observer 205 is able to calculate, based on the load angle $\theta_1$ which is the measured state, the estimated load angle which is the estimated state using equation (12).

$$\ddot{\hat{\theta}}_1 + f(\hat{\theta}_1, \dot{\hat{\theta}}_1) = g(\hat{\theta}_1) T_m + L_1 \text{sgn}(s_1), s_1 = \dot{\tilde{\theta}}_1 + c_1 \tilde{\theta}_1, \tilde{\theta}_1 = \theta_1 - \hat{\theta}_1 \quad (12)$$

Meaning of the symbols in equation (12) are given as follows:
$\hat{\theta}_1$: estimated load angle;
$\tilde{\theta}_1$: load angle estimation error;
$c_1$: speed in which load angle estimation error converges to 0;
$s_1$: intermediate variable;
sgn(•): signum function (signfunction); and
$L_1$: load state observer gain.

Calculating the difference between equation (5) and equation (12) yields a load angle estimation error equation as in equation (13).

$$\ddot{\tilde{\theta}}_1 + f(\theta_1, \dot{\theta}_1) = [g(\theta_1) - g(\hat{\theta}_1)] T_m - L_1 \text{sgn}(s_1) \quad (13)$$

Described in what follows is a method of setting a first estimator gain $L_1$ to make the load angle estimation error converge to 0 in equation (13). First, a Lyapunov function candidate $V_1$ as in the equation (14) is introduced.

$$V_1 = \frac{1}{2} s_1^2 > 0, \forall s_1 \neq 0 \quad (14)$$

The first order time derivative in equation (14) can be expressed as equation (15).

$$\dot{V}_1 = s_1 \dot{s}_1 \quad (15)$$
$$= s_1 (\ddot{\tilde{\theta}}_1 + c_1 \dot{\tilde{\theta}})$$
$$= s_1 \{ f(\hat{\theta}_1, \dot{\hat{\theta}}_1) - f(\theta_1, \dot{\theta}_1) + [g(\theta_1) - g(\hat{\theta}_1)] T_m - L_1 \text{sgn}(s_1) + c_1 \dot{\tilde{\theta}}_1 \}$$

The first estimator gain $L_1$ that makes (the right hand side of equation (15)) negative ($\forall s_1 \neq 0$) can be expressed as equation (16).

$$L_1 > |f(\hat{\theta}_1, \dot{\hat{\theta}}_1) - f(\theta_1, \dot{\theta}_1) + [g(\theta_1) - g(\hat{\theta}_1)] T_m + c_1 \dot{\tilde{\theta}}_1| \quad (16)$$

Further, by setting the load state observer gain $L_1$ as equation (16), the load angle estimation error converges to 0, and the estimated load angle converges to the load angle $\theta_1$. Accordingly, the load speed that may contain small amount of noise can be directly obtained.

When the control is designed so that the load angle $\theta_1$ tracks the load angle reference input $\theta_{1r}$ using the thus-obtained estimated load angle, the estimated load speed, equations (9), (10), and (11), the motor power that is consumed can be obtained using equation (17).

The required power estimator 207 calculates the estimated required power $p(\theta_{1r})$ required to perform the operation according to the load angle reference input $\theta_{1r}$ as a polynomial of the load angle reference input $\theta_{1r}$ as in equation (17) based on the estimated load angle and the estimated load speed that are estimated state, for example.

$$p(\theta_{1r}) \approx \left(-\frac{a_2}{b_2}\theta_{1r} - \frac{1}{b_2}\int_0^t c_2 \, dI\right) \frac{(a_1 b_2 - a_2 b_1)\ddot{\theta}_1 + b_2 c_1 - b_1 c_2}{-b_2} \approx \quad (17)$$
$$\left(-\frac{a_2}{b_2}\theta_{1r} + \frac{\hat{C}_2}{b_2}\right) \times$$
$$\frac{(a_1 b_2 - a_2 b_1)\ddot{\theta}_{1r} + b_2 c_{10}\theta_{1r} - b_1(c_{21}\dot{\theta}_{1r}^2\theta_{1r} + c_{22}\theta_{1r})}{-b_2} \approx$$
$$[\alpha_1 \theta_{1r}(k) + \alpha_0] \times [\beta_3 \theta_{1r}^3(k) + \beta_2 \theta_{1r}^2(k) + \beta_1 \theta_{1r}(k) + \beta_0]$$

In equation (17), each coefficient shown in equation (18) is used. The required power estimator 207 supplies the estimated required power $p(\theta_{1r})$ calculated by equation (17) to the modified reference input unit 210.

$$\hat{C}_2 = -\int_0^t c_2(\hat{\theta}_1, \dot{\hat{\theta}}_1) dt, \quad (18)$$
$$c_{10} = -m_1 gl, c_{21} = -m_1 lr, c_{22} = -m_1 gl,$$
$$\alpha_0 = \frac{a_2}{Tb_2}\hat{\theta}_1(k-1) + \frac{\hat{C}_2}{b_2}, \alpha_1 = -\frac{a_2}{Tb_2},$$
$$\beta_0 = \frac{a_1 b_2 - a_2 b_1}{b_2 T^2} \hat{\theta}(k-1) + \frac{a_1 b_2 - a_2 b_1}{b_2 T} \dot{\hat{\theta}}(k-1),$$
$$\beta_1 = -\frac{a_1 b_2 - a_2 b_1}{b_2 T^2} - c_{10} + \frac{b_1 c_{21}}{b_2 T^2} \hat{\theta}_1^2(k-1) + \frac{b_1 c_{22}}{b_2},$$
$$\beta_2 = -\frac{2b_1 c_{21}}{b_2 T^2} \hat{\theta}_1(k-1), \beta_3 = \frac{b_1 c_{21}}{b_2 T^2}$$

Since the sign of $\alpha_1 \times \beta_3$ is always positive in equation (18), it is found that equation (17) is a quartic function opened upward with respect to the load angle reference input $\theta_{1r}$. In short, the estimated required power $p(\theta_{1r})$ is a time-variant four-dimensional polynomial of the load angle reference input $\theta_{1r}$.

When the available motor power is reduced to $P_{lim}[W]$ due to a failure of a part of an amplifier, a battery, or a motor winding, the condition of the load angle reference input $\theta_{1r}$ to keep the inverted state of the inverted vehicle 100 can be expressed as equation (19).

$$p(\theta_{1r}) \in [-p_{lim}, p_{lim}] \quad (19)$$

The critical power estimator 206 calculates the power consumed by the motor using equation (9) based on the torque reference input output from the controller 203 and the estimated load speed, for example. When the calculated power saturates, the critical power estimator 206 supplies the saturated value to the modified reference input unit 210 as the estimated critical power $P_{lim}$.

Further, from equations (5), (17), and (18), the power $p(\theta_{1r})$ consumed by the motor is expressed as a four-dimensional polynomial, where the coefficient $\alpha_1 \beta_3$ of the highest order is a positive number. Therefore, the estimated required power $p(\theta_{1r})$ consumed by the motor forms a curve that extends from the first quadrant to the second quadrant. Further, the number of extrema can be classified according to the number of real solutions of equation (20).

$$\frac{dp(\theta_{1r})}{d\theta_{1r}} = 4\alpha_1\beta_3\theta_{1r}^3 + 3(\alpha_0\beta_3 + \alpha_1\beta_2)\theta_{1r}^2 + \quad (20)$$

$$2(\alpha_0\beta_2 + \alpha_1\beta_1)\theta_{1r} + \alpha_0\beta_1 + \alpha_1\beta_0 = 0$$

The estimator for the first order derivative of required power 208 calculates the estimated first order derivative of required power as a polynomial of the load angle reference input $\theta_{1r}$ in equation (20) based on the estimated state received from the state observer 205, for example. The estimator for the first order derivative of required power 208 supplies the estimated first order derivative of required power that is calculated to the modified reference input unit 210.

Further, the number of real solutions of equation (20) can be found using the sign of the discriminant in equation (21).

$$\Delta = 36(\alpha_0\beta_3+\alpha_1\beta_2)^2(\alpha_0\beta_2+\alpha_1\beta_1)^2 - 128\alpha_1\beta_3(\alpha_0\beta_2+\alpha_1\beta_1)^3 - 108(\alpha_0\beta_3+\alpha_1\beta_2)^3(\alpha_0\beta_1+\alpha_1\beta_0) - 432(\alpha_1\beta_3)^2(\alpha_0\beta_1+\alpha_1\beta_0)^2 + 432\alpha_1\beta_3(\alpha_0\beta_3+\alpha_1\beta_2)(\alpha_0\beta_2+\alpha_1\beta_1\alpha_1\beta) \quad (21)$$

The discriminant unit 209 is able to calculate the discriminant value $\Delta$ to discriminate the estimated first order derivative of required power using equation (21) based on the estimated state received from the state observer 205, for example. The discriminant unit 209 supplies the discriminant value $\Delta$ that is calculated to the modified reference input unit 210.

When the estimated required power $p(\theta_{1r})$ received from the required power estimator 207 falls within the estimated critical power $P_{lim}$ based on equation (19), the modified reference input unit 210 supplies the first reference signal indicating that the estimated required power falls within the estimated critical power to the reference input modifier 202.

On the other hand, when the estimated required power $p(\theta_{1r})$ received from the required power estimator 207 exceeds the estimated critical power $P_{lim}$ based on equation (19), the modified reference input unit 210 calculates the modified load angle reference input $\theta_{1r}+\Delta\theta_{1r}$ wherein the load angle reference input $\theta_{1r}$ is modified so that the estimated required power $p(\theta_{1r})$ falls within the estimated critical power $P_{lim}$ based on the following cases (case 1, case 2, case 3) on the basis of the discriminant value $\Delta$ received from the discriminant unit 209 and equations (22) and (23) on the basis of the sign of the estimated first order derivative of required power. The modified reference input unit 210 then supplies the modified load angle reference input $\theta_{1r}+\Delta\theta_{1r}$ that is calculated and the second reference signal indicating that the estimated required power exceeds the estimated critical power to the reference input modifier 202.

Now, the number of extrema of the estimated required power $p(\theta_{1r})$ indicating the power consumed by the motor can be classified into (case 1), (case 2), or (case 3) using the discriminant value $\Delta$ in equation (21):
(case 1)
  when $\Delta<0$, $p(\theta_{1r})$ has one minimum;
(case 2)
  when $\Delta=0$, $p(\theta_{1r})$ has one minimum and one stationary point; and
(case 3)
  when $\Delta>0$, $p(\theta_{1r})$ has two minima, and one maximum.
For example, when it is determined that the example corresponds to (case 1) or (case 2), the modified reference input unit 210 modifies the load angle reference input $\theta_{1r}$ to the modified load angle reference input $\theta_{1r}+\Delta\theta_{1r}$ using equation (22), thereby vehicle control apparatus 200 is capable of continuing the inverted control of the inverted vehicle 100 within the estimated critical power $P_{lim}$, which is the power available at the moment.

More specifically, (a) when the absolute values of the estimated required power $p(\theta_{1r})$ exceeds the estimated critical power $P_{lim}$, the sign of the discriminant value becomes negative (case 1) or 0 (case 2), and the estimated first order derivative of required power is non-zero, the modified reference input unit 210 modifies the load angle reference input $\theta_{1r}$ using the increment of the load angle reference input $\Delta\theta_{1r}$ having a sign opposite to a product of a sign of the estimated first order derivative of required power in the load angle reference $\theta_{1r}$ input from the reference input device 201 using equation (22) and a sign of the estimated required power, to calculate the modified load angle reference input $\theta_{1r}+\Delta\theta_{1r}$.

Further, (b) when it is determined that the estimated required power $p(\theta_{1r})$ exceeds the estimated critical power $P_{lim}$, the sign of the discriminant value becomes negative (case 1) or 0 (case 2), and the estimated first order derivative of required power is zero, the modified reference input unit 210 modifies the load angle reference input $\theta_{1r}$ using the increment of the load angle reference input $\Delta\theta_{1r}$ having a sign opposite to a product of a sign of the estimated required power and a sign of the estimated first order derivative of required power which is a function of the load angle reference input with an infinitesimal angle $\delta$ ($\theta_{1r}+\delta$), using equation (22), to calculate the modified load angle reference input $\theta_{1r}+\Delta\theta_{1r}$.

$$\operatorname{sgn}(\Delta\theta_{1r}) = \begin{cases} -\operatorname{sgn}\left(\dfrac{dp(\theta_{1r})}{d\theta_{1r}}\right) & p(\theta_{1r}) > p_{lim}, \dfrac{dp(\theta_{1r})}{d\theta_{1r}} \neq 0 \\ \operatorname{sgn}\left(\dfrac{dp(\theta_{1r})}{d\theta_{1r}}\right) & p(\theta_{1r}) < -p_{lim}, \dfrac{dp(\theta_{1r})}{d\theta_{1r}} \neq 0 \\ -\operatorname{sgn}\left(\dfrac{dp(\theta_{1r}+\delta)}{d\theta_{1r}}\right) & p(\theta_{1r}) > p_{lim}, \dfrac{dp(\theta_{1r})}{d\theta_{1r}} = 0 \\ \operatorname{sgn}\left(\dfrac{dp(\theta_{1r}+\delta)}{d\theta_{1r}}\right) & p(\theta_{1r}) < -p_{lim}, \dfrac{dp(\theta_{1r})}{d\theta_{1r}} = 0 \end{cases} \quad (22)$$

Note that $\delta$ used in equation (22) is an infinitesimal angle (e.g., $1\times10^{-7}$[rad]). Further, the magnitude of the load angle reference modification amount $\Delta\theta_{1r}$ in equations (22) and (23) is chosen a value appropriately small with respect to the range of movement of the load angle $\theta_1$ (e.g., a value empirically obtained in full consideration of safety, about $\pi/40$ [rad]).

When (case 3) applies, the modified reference input unit 210 modifies the load angle reference $\theta_{1r}$ to the modified load angle reference input $\theta_{1r}+\Delta\theta_{1r}$ using equation (23), so as to be able to continue the inverted control of the inverted vehicle 100 within the estimated critical power $P_{lim}$, which is the power available at the moment.

More specifically, (c) when the estimated required power $p(\theta_{1r})$ exceeds the estimated critical power $P_{lim}$, the sign of the discriminant value is positive (case 3), and the estimated first order derivative of required power is non-zero, the modified reference input unit 210 modifies the load angle reference input $\theta_{1r}$ using the increment of load angle reference input $\Delta\theta_{1r}$ having a sign opposite to a product of a sign of the estimated required power and a sign of the estimated first order derivative of required power in the load angle reference $\theta_{1r}$ input from the reference input device 201, using equation (23), to calculate the modified load angle reference $\theta_{1r}+\Delta\theta_{1r}$.

Further, (d) when the estimated required power $p(\theta_{1r})$ exceeds the estimated critical power $P_{lim}$, the sign of the discriminant value is positive (case 3), and the estimated first order derivative of required power vanishes, the modified reference input unit 210 modifies the load angle reference input $\theta_{1r}$ using the increment of load angle reference input $\Delta\theta_{1r}$ having a sign opposite to a sign of the load angle reference input $\theta_{1r}$ received from the reference input device 201, using equation (23), to calculate the modified load angle reference input $\theta_{1r}+\Delta\theta_{1r}$.

$$\mathrm{sgn}(\Delta\theta_{1r}) = \begin{cases} -\mathrm{sgn}\left(\dfrac{dp(\theta_{1r})}{d\theta_{1r}}\right) & p(\theta_{1r}) > p_{lim}, \dfrac{dp(\theta_{1r})}{d\theta_{1r}} \neq 0 \\ \mathrm{sgn}\left(\dfrac{dp(\theta_{1r})}{d\theta_{1r}}\right) & p(\theta_{1r}) < -p_{lim}, \dfrac{dp(\theta_{1r})}{d\theta_{1r}} \neq 0 \\ -\mathrm{sgn}(\theta_{1r}) & \dfrac{dp(\theta_{1r})}{d\theta_{1r}} = 0 \end{cases} \quad (23)$$

As described above, when the available motor power is reduced due to a failure of a part of a battery, an amplifier, or a motor winding while the inverted vehicle 100 travels and an inverted control to make the load angle $\theta_1$ track the load angle reference input $\theta_{1r}$ is disabled, the load angle reference input $\theta_{1r}$ is modified to the modified load angle reference $\theta_{1r}+\Delta\theta_{1r}$ so as to be able to keep the inverted state within the available motor power using equations (22) and (23), thereby making it possible to continue the inverted control and prevent an overturn or the like.

Described next is an example wherein the controller 203 performs a feedback control to make the load angle of the inverted vehicle 100 track the load angle reference input or the modified load angle reference input from the reference input modifier 202. It is assumed that the controller 203 makes the load angle $\theta_1$ of equation (5) track the load angle reference $\theta_{1r}$ using the motor torque $T_m$ shown in equation (24).

$$T_m = \frac{M}{g(\theta_1)\mathrm{sgn}(s)} \quad (24)$$
$$s = \dot\theta_{1r} - \dot\theta_1 + c(\theta_{1r} - \theta_1)$$

Meanings of the symbols in equation (24) are as follows:
M: amplitude of control;
s: intermediate variable; and
c: speed in which the load angle $\theta_1$ converges to the load angle reference $\theta_{1r}$.

The controller 203 derives the sufficient condition of the amplitude of control M of the motor torque $T_m$ in equation (24) to make the load angle $\theta_1$ converge to the load angle reference $\theta_{1r}$ is derived in what follows. To make the load angle $\theta_1$ converge to the load angle reference input $\theta_{1r}$, it is required to make the intermediate variable s converge to 0. Thus, equation (25) is employed as a candidate of Lyapunov function.

$$V = \frac{1}{2}s^2 > 0, \forall s \neq 0 \quad (25)$$

Further, it holds that V>0 for all s≠0. If the first order time derivative of V is negative for all s≠0, the intermediate variable s can converge to 0. In summary, establishment of equation (26) results in convergence of the load angle $\theta_1$ to the load angle reference input $\theta_{1r}$.

$$\dot V = s\dot s = s[\ddot\theta_{1r} - \ddot\theta_1 + c(\dot\theta_{1r} - \dot\theta_1)] = s[\ddot\theta_{1r} + f(\theta_1,\dot\theta_1) - M\mathrm{sgn}(s) + c(\dot\theta_{1r} - \dot\theta_1)] < 0, \forall s \neq 0 \quad (26)$$

The sufficient condition of equation (26) is given by equation (27).

$$M > |\ddot\theta_{1r} f(\theta_1,\dot\theta_1) + c(\dot\theta_{1r} - \dot\theta_1)| \quad (27)$$

For example, setting the amplitude of control M as equation (27) establishes equation (26), which makes the intermediate variable s converge to 0. When s converges to 0, the load angle $\theta_1$ converges to the load angle reference input $\theta_{1r}$ with rate of convergence in equation (24). As described above, even when the available motor power is reduced due to a failure of an electrical system such as a battery, an amplifier or a motor winding or the like, the load angle $\theta_1$ of the inverted vehicle 100 can be controlled within the available motor power.

Figure 4:
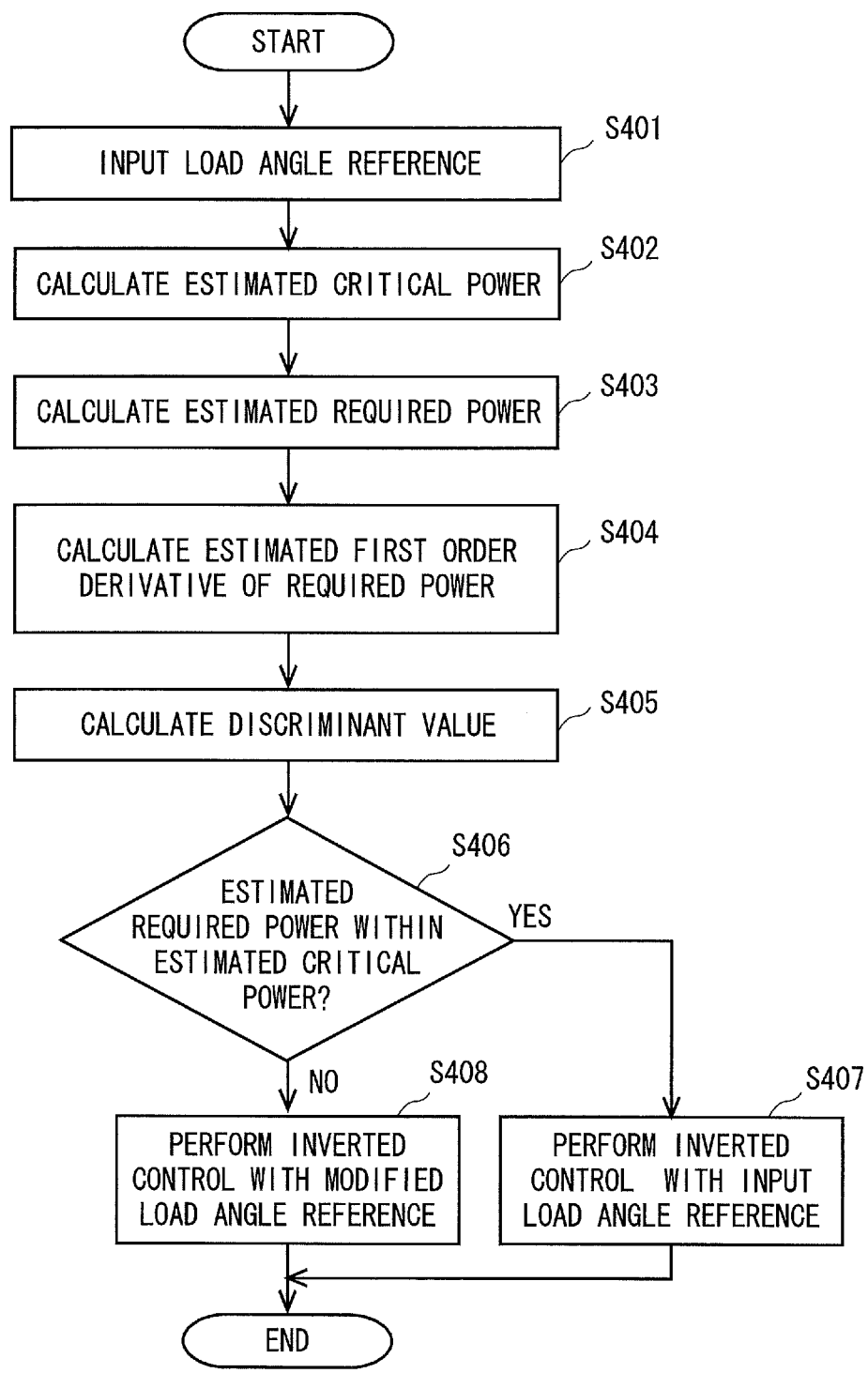
FIG. 4 is a flow chart showing one example of a control process flow of the vehicle control apparatus according to the exemplary embodiment of the present invention.

Described next is a control method to continue the inverted control within the available critical power even when the available motor power is reduced due to a failure of an electrical system or the like. FIG. 4 is a flow chart showing one example of a control processing flow of the vehicle control apparatus according to the exemplary embodiment.

First, the reference input device 201 receives the load angle reference input $\theta_{1r}$, which is a reference input of the load angle $\theta_1$ according to the manipulation of the inverted vehicle 100 by the driver (step S401).

Next, the critical power estimator 206 calculates the power consumed by the motor based on the torque reference input of the motor received from the controller 203 and the estimated states received from the state observer 205. When the calculated power saturates, the critical power estimator 206 calculates the saturated value as the estimated critical power $P_{lim}$ (step S402), and supplies the estimated critical power to the modified reference input unit 210.

Then, the required power estimator 207 calculates the estimated required power $p(\theta_{1r})$ required to operate the inverted vehicle 100 according to the load angle reference input $\theta_{1r}$ from the reference input device 201 based on the estimated state received from the state observer 205 using equation (17) (step S403), and supplies the estimated required power to the modified reference input unit 210.

The estimator for the first order derivative of required power 208 then calculates the estimated first order derivative of required power based on the estimated states received from the state observer 205 using equation (20) (step S404), and supplies the estimated first order derivative of required power to the modified reference input unit 210.

Further, the discriminant unit 209 calculates the discriminant value Δ to discriminate the estimated first order derivative of required power based on the estimated state received from the state observer 205 using equation (21) (step S405), and supplies the calculated value to the modified reference input unit 210.

Furthermore, the modified reference input unit 210 determines whether the estimated required power $p(\theta_{1r})$ based on the load angle reference input $\theta_{1r}$ received from the reference input device 201 falls within the estimated critical power $P_{lim}$ using equation (19) based on the load angle reference input received from the reference input device 201, the estimated critical power $P_{lim}$ received from the critical power estimator 206, and the estimated required power $p(\theta_{1r})$ received from the required power estimator 207 (step S406).

When it is determined that the estimated required power $p(\theta_{1r})$ based on the load angle reference input $\theta_{1r}$ received from the reference input device 201 falls within the estimated critical power $P_{lim}$ (YES in step S406), the modified reference input unit 210 supplies the first reference signal indicating that the estimated required power falls within the estimated critical power to the reference input modifier 202. Upon receiving the first reference signal from the modified reference input unit 210, the reference input modifier 202 supplies the load angle reference input $\theta_{1r}$ received from the reference input device 201 to the controller 203. The controller 203 performs feedback control so that the load angle $\theta_1$ of the inverted vehicle 100 track the load angle reference input $\theta_{1r}$ received from the reference input modifier 202 (step S407).

Meanwhile, when the absolute value of the estimated required power $p(\theta_{1r})$ based on the load angle reference input $\theta_{1r}$ received from the reference input device 201 exceeds the estimated critical power $P_{lim}$ (NO in step S406), the modified reference input unit 210 calculates the modified load angle reference input $\theta_{1r}+\Delta\theta_{1r}$ in wherein the load angle reference input $\theta_{1r}$ is modified so that the estimated required power $p(\theta_{1r})$ falls within the estimated critical power $P_{lim}$ using equations (22) and (23) based on a sign of the estimated first order derivative of required power received from the estimator for the first order derivative of required power 208 and the discriminant value $\Delta$ received from the discriminant unit 209. The modified reference input unit 210 then supplies the modified load angle reference input $\theta_{1r}+\Delta\theta_{1r}$ that is calculated and the second reference signal indicating that the absolute value of the estimated required power exceeds the estimated critical power to the reference input modifier 202.

Upon receiving the second reference signal from the modified reference input unit 210, the reference input modifier 202 supplies the modified load angle reference input $\theta_{1r}+\Delta\theta_{1r}$ received from the modified reference input unit 210 to the controller 203. The controller 203 performs a feedback control so that the load angle $\theta_1$ of the inverted vehicle 100 tracks the modified load angle reference input $\theta_{1r}+\Delta\theta_{1r}$ received from the reference input modifier 202 (step S408).

Described next is a simulation to confirm the effect obtained by keeping the inverted control is performed within the available critical power even when the available motor power is reduced due to a failure of an electrical system or the like. In this simulation, the following numerical values are set for each parameter, for example:

$m_1$=70[kg];
$J_1$=25.2[kg·m$^2$];
$m_2$=15[kg];
$J_2$=0.075[kg·m$^2$];
l=0.9[m];
r=0.1[m];
g=9.8[m/s$^2$];
c=500[rad/s];
$c_1$=500[rad/s]; and
T=1×10$^{-3}$[s].

It is assumed, in this simulation, that a failure occurs in a part of the battery cell during travelling and the critical power to operate the inverted vehicle 100 decreases from 1000[W] to 200[W]. In this case, the vehicle control apparatus 200 according to the exemplary embodiment calculates the estimated required power $p(\theta_{1r})$ that is required to operate the inverted vehicle 100 according to the load angle reference input $\theta_{1r}$ from the reference input device 201. When the estimated required power $p(\theta_{1r})$ exceeds the estimated critical power $P_{lim}$, the vehicle control apparatus 200 modifies the load angle reference input $\theta_{1r}$ to continue the inverted control within the estimated critical power $P_{lim}$.

Figure 5:
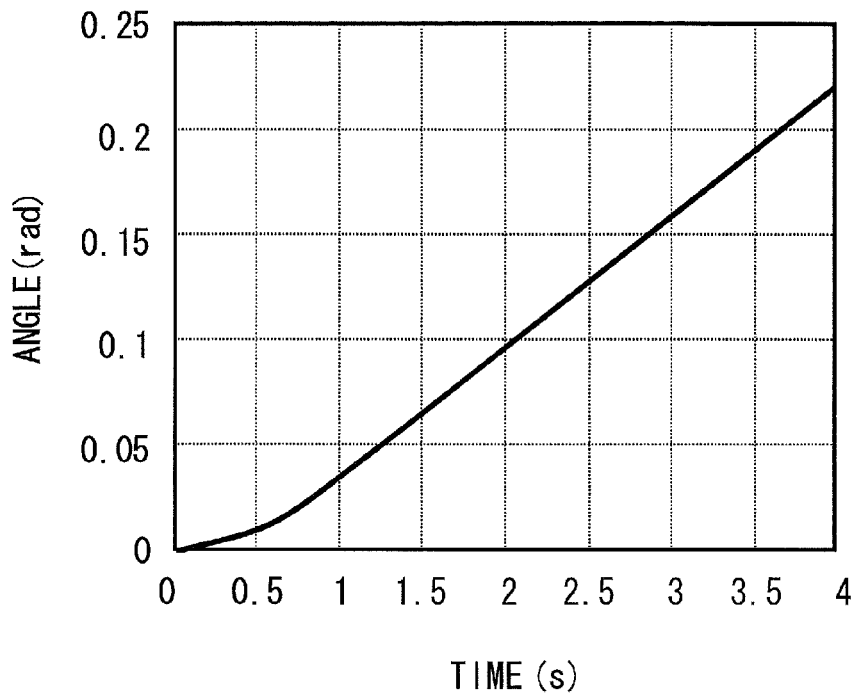
FIG. 5 is a diagram showing a simulation result to confirm the effect of continuing an inverted control within a critical power in case of a failure in a battery cell.

As shown in FIG. 5, it is found that the load angle reference input $\theta_{1r}$ (dashed line) from the reference input device 201, the modified load angle reference input $\theta_{1r}+\Delta\theta_{1r}$ (solid line) modified by the modified reference input unit 210, and the load angle $\theta_1$ (alternate long and short dash line) by the state sensors 204 are substantially coincide with one another. According to the vehicle control apparatus 200 of the exemplary embodiment of the present invention, since the increment of load angle reference input $\Delta\theta_{1r}$ is 1×10$^{-5}$[rad], it is found that the modified load angle reference input $\theta_{1r}+\Delta\theta_{1r}$ is substantially equivalent to the load angle reference input $\theta_{1r}$ before modification, and the load angle $\theta_1$ successfully tracks the modified load angle reference input $\theta_{1r}+\Delta\theta_{1r}$.

Figure 6:
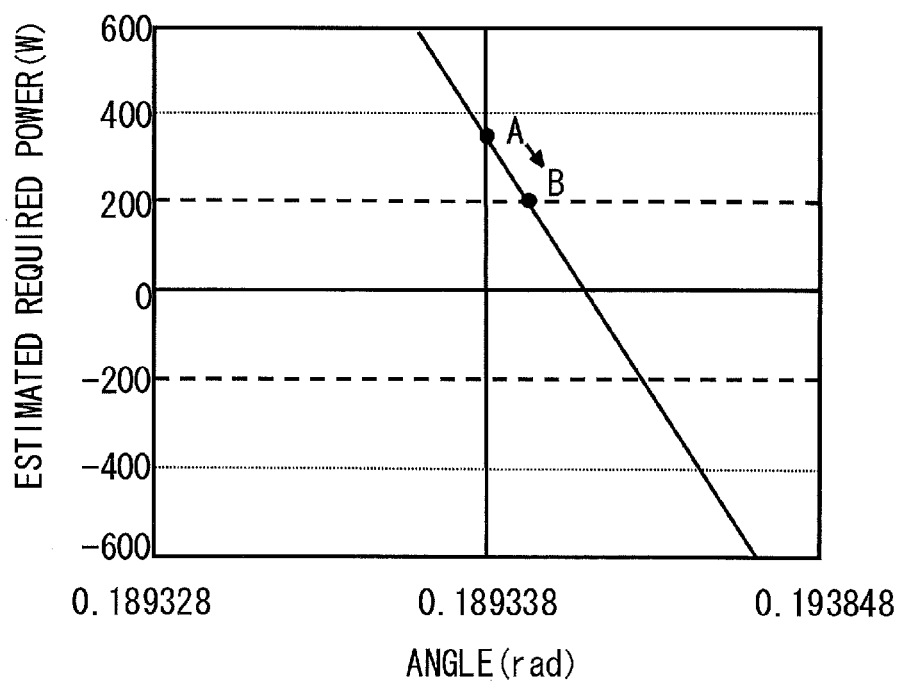
FIG. 6 is a diagram showing a simulation result to confirm the effect of continuing an inverted control within a critical power in case of a failure in a battery cell.

FIG. 6 shows the changes of the estimated required power $p(\theta_{1r})$ in equation (17) at 3.5[s] after the beginning of control by the vehicle control apparatus 200 (thick solid line). In FIG. 6, dashed lines indicate the estimated critical power ±200[W], and the thin solid line indicates the load angle reference input $\theta_{1r}$ from the reference input device 201.

As in FIG. 6, when the load angle reference input $\theta_{1r}$ from the reference input device 201 is used, the estimated required power $p(\theta_{1r})$ takes a value at the point A. Thus, it is found that the estimated required power exceeds the estimated critical power $P_{lim}$, which results in shortage of the motor power and makes it impossible to continue the inverted control. Meanwhile, when the modified reference input unit 210 modifies the value to the modified load angle reference input $\theta_{1r}+\Delta\theta_{1r}$ shown by the point B using equations (22) and (23), the estimated required power $p(\theta_{1r}+\Delta\theta_{1r})$ does not exceed the estimated critical power $P_{lim}$. Therefore, it is found that the inverted vehicle 100 can continue the inverted control.

Figure 7:
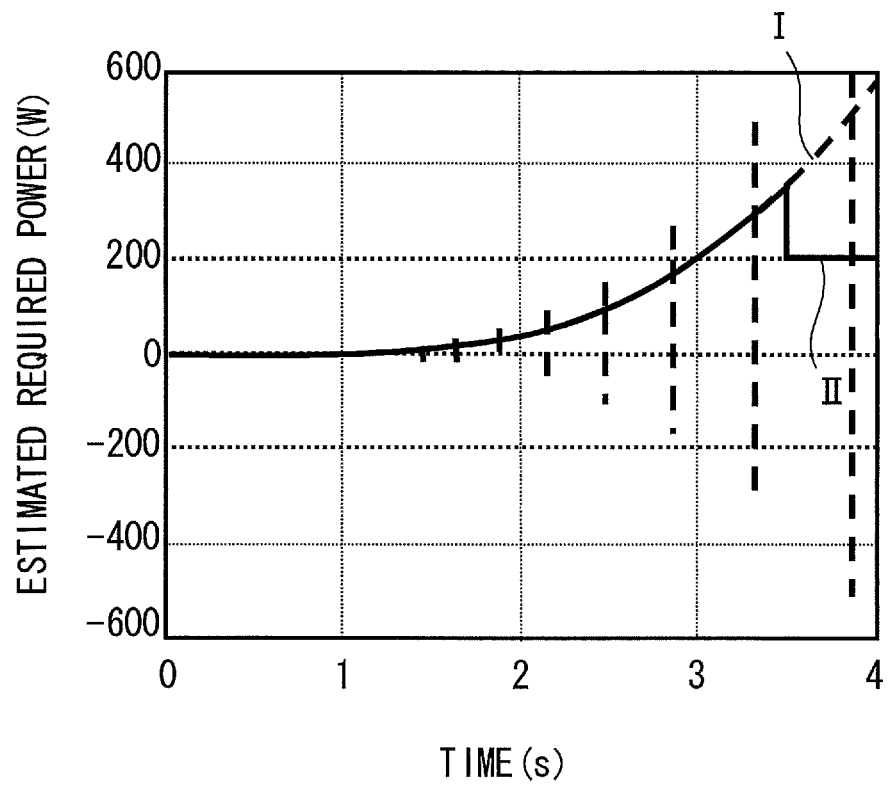
FIG. 7 is a diagram showing a simulation result to confirm the effect of continuing an inverted control within a critical power in case of a failure in a battery cell.

FIG. 7 shows the estimated required power $p(\theta_{1r})$ (dashed line I) required when the load angle reference input $\theta_{1r}$ from the reference input device 201 is used and the estimated required power $p(\theta_{1r}+\Delta\theta_{1r})$ (solid line II) required when the modified load angle reference input $\theta_{1r}+\Delta\theta_{1r}$ of the present invention is used. As shown in FIG. 7, when a failure of a battery cell occurs and the available motor power is reduced, for example, at about 3.5[s] after the beginning of control of the vehicle control apparatus 200, the modified reference input unit 210 modifies the load angle reference input $\theta_{1r}$ to the modified load angle reference input $\theta_{1r}+\Delta\theta_{1r}$ according to the exemplary embodiment. Accordingly, as shown by the solid line II, the estimated required power can be suppressed within the estimated critical power $P_{lim}$, e.g., output of 200 [W] that is available, thereby controller 203 is capable of continuing the inverted control.

Described above in the exemplary embodiment is the case wherein the inverted control can be continued within the estimated critical power when the available motor power is reduced due to a failure of a battery cell. The present invention is also applicable to a case wherein the available motor power decreases for any other reasons in addition to a failure of an electrical system including disconnection of a part of multiple windings of a motor, or failure of a part of a servo amplifier with redundant circuit.

According to the vehicle control apparatus 200 of the exemplary embodiment, when the estimated required power $p(\theta_{1r})$ exceeds the estimated critical power $P_{lim}$, the inverted control is performed by calculating the modified load angle reference input $\theta_{1r}+\Delta\theta_{1r}$ wherein the load angle reference input $\theta_{1r}$ is modified so that the absolute value of the estimated required power $p(\theta_{1r})$ falls within the estimated critical power $P_{lim}$ to make the load angle $\theta_1$ of the inverted vehicle 100 track the modified load angle reference input $\theta_{1r}+\Delta\theta_{1r}$. Accordingly, the inverted control can be continued with the available motor power even when the available motor power of the inverted vehicle 100 is reduced.

The present invention is not limited to the exemplary embodiments described above, but may be changed as appropriate without departing from the spirit of the present invention.

While the present invention has been described as a hardware configuration in the exemplary embodiment, the present invention can achieve the processing shown in FIG. 4 also by causing a CPU to execute a computer software.

The software can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives), optical magnetic storage media (such as magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory)). The software may be provided to a computer using any type of transitory computer readable media. Examples of transitory computer readable media include electric signals, optical signals, and electromagnetic waves. Transitory computer readable media can provide the program to a computer via a wired communication line (such as electric wires, and optical fibers) or a wireless communication line.

The technical elements described in the specification and shown in the drawings achieve technical effects by each of the elements or the combination thereof, and are not limited to the combinations described in claims at the time of application. Further, the techniques exemplified in the specification and shown in the drawings may simultaneously accomplish a plurality of exemplary objects, and achieve the technical effects by accomplishing one of the exemplary objects.

INDUSTRIAL APPLICABILITY

The present invention is applicable to a vehicle control apparatus that controls an inverted vehicle travelling while maintaining an inverted state.

Reference Signs List

| | |
|---|---|
| 100 | INVERTED VEHICLE |
| 101 | PLATFORM |
| 102 | WHEEL |
| 103 | HANDLE |
| 104 | GRIP |
| 200 | VEHICLE CONTROL APPARATUS |
| 201 | REFERENCE INPUT DEVICE |
| 202 | REFERENCE INPUT MODIFIER |
| 203 | CONTROLLER |
| 204 | STATE SENSORS |
| 205 | STATE OBSERVER |
| 206 | CRITICAL POWER ESTIMATOR |
| 207 | REQUIRED POWER ESTIMATOR |
| 208 | ESTIMATOR FOR FIRST ORDER DERIVATIVE OF REQUIRED POWER |
| 209 | DISCRIMINANT UNIT |
| 210 | MODIFIED REFERENCE INPUT UNIT |

The invention claimed is:

1. A vehicle control apparatus for controlling a motor that drives a wheel of a vehicle, the vehicle control apparatus comprising:
   state measurement means for measuring states of the vehicle;
   required power estimation means for calculating an estimated required power indicating a motor power required to operate the vehicle based on the states of the vehicle measured by the state measurement means;
   critical power estimation means for calculating a critical power when the motor power saturates based on the states of the vehicle measured by the state measurement means;
   modified reference input means for modifying a reference input so that the estimated required power falls within the estimated critical power when it is determined that the estimated required power estimated by the required power estimation means exceeds the estimated critical power estimated by the critical power estimation means; and
   control means for controlling a motor of the vehicle based on the reference input modified by the modified reference input means.

2. The vehicle control apparatus according to claim 1, wherein
   the state measurement means detects a load angle indicating an inclination of the vehicle,
   the vehicle control apparatus further comprises reference input means for receiving a load angle reference input indicating a travelling instruction of the vehicle, and
   the control means for controlling the vehicle so that the load angle measured by the state measurement means tracks the load angle reference input from the reference input means.

3. The vehicle control apparatus according to claim 2, wherein the required power estimation means calculates the estimated required power required to operate the vehicle according to the load angle reference input from the reference input means as a polynomial of the load angle reference input based on the states received from the state measurement means.

4. The vehicle control apparatus according to claim 2, further comprising:
   estimation means for a first order derivative of required power for calculating a first order derivative of the estimated required power as a polynomial of the load angle reference input based on the state amount received from the state measurement means; and
   discriminant means for calculating a discriminant value to discriminate the first order derivative of the estimated required power based on the states received from the state measurement means.

5. The vehicle control apparatus according to claim 4, wherein
   the modified reference input means calculates the modified load angle reference input wherein the load angle reference input is modified so that the estimated required power falls within the estimated critical power based on a sign of the first order derivative of the estimated required power from the estimation means for the first order derivative of required power, and the discriminant value received from the discriminant means when it is determined that the estimated required power based on the load angle reference input received from the reference input means exceeds the estimated critical power, and
   the control means performs an inverted control so that the load angle of the vehicle tracks the modified load angle reference input that is modified.

6. The vehicle control apparatus according to claim 5, wherein
   the modified reference input means performs the following processing of:
   (a) modifying the load angle reference input with an increment having a sign opposite to a product of a sign of the first order derivative of the estimated required power and a sign of the estimated required power when it is determined that the estimated required power exceeds the estimated critical power, the sign of the discriminant value is negative or 0, and the first order derivative of the estimated required power is not 0;

(b) modifying the load angle reference input with an increment having a sign opposite to a product of a sign of the estimated required power and a sign of the first order derivative of the estimated required power in a changed load angle reference input wherein an infinitesimal angle is added to the load angle reference input when it is determined that the estimated required power exceeds the estimated critical power, a sign of the discriminant value is negative or 0, and the first order derivative of the estimated required power is 0;

(c) modifying the load angle reference input with an increment having a sign opposite to a product of a sign of the estimated required power and a sign of the first order derivative of the estimated required power in the load angle reference input when it is determined that the estimated required power exceeds the estimated critical power, a sign of the discriminant value is positive, and the first order derivative of the estimated required power is not 0; and (d) modifying the load angle reference input with an increment having a sign opposite to a sign of the load angle reference input when it is determined that the estimated required power exceeds the estimated critical power, the sign of the discriminant value is positive, and the first order derivative of the estimated required power is 0.

7. The vehicle control apparatus according to claim 2, wherein the control means performs an inverted control so that the load angle of the vehicle tracks the load angle reference input by the reference input means when it is determined by the modified reference input means that the estimated required power based on the load angle reference input received from the reference input means falls within the estimated critical power.

8. The vehicle control apparatus according to claim 2, wherein the estimated required power is a time-variant four-dimensional polynomial of the load angle reference input.

9. The vehicle control apparatus according to claim 2, further comprising reference input modification means for supplying one of the load angle reference input from the reference input means and a modified load angle reference input modified by the modified reference input means to the control means according to an instruction from the modified reference input means,
wherein the control means controls the motor of the vehicle so that the load angle of the vehicle tracks the modified load angle reference input and the load angle reference input output from the reference input modification means.

10. The vehicle control apparatus according to claim 1, wherein the critical power estimation means calculates power consumed by the motor based on a torque reference input of the motor received from the control means and the states received from the state measurement means, and when the power consumed by the motor saturates the critical power estimation means calculates the saturated power as the estimated critical power.

11. The vehicle control apparatus according to claim 1, wherein the state measurement means comprises a state measurement unit for measuring the states of the vehicle as measured states, and a state observation unit for calculating estimated states which is an estimation value of the measured state based on the measured states measured by the state measurement unit.

12. The vehicle control apparatus according to claim 1, wherein the state measurement means measures at least one of a load angle, a load speed, a load acceleration, and a wheel angle of the vehicle.

13. A control method of a vehicle control apparatus for controlling a motor that drives a wheel of a vehicle, the method comprising the following steps of:
measuring a state amount of the vehicle;
calculating an estimated required power indicating a motor power required to operate the vehicle based on the measured states of the vehicle;
calculating a critical power when the motor power saturates based on the measured states of the vehicle;
modifying a reference input so that the estimated required power falls within the estimated critical power when it is determined that the estimated required power that is estimated exceeds the estimated critical power that is estimated; and
controlling a motor of the vehicle based on the modified reference input.

14. A non-transitory computer readable medium storing a control software of a vehicle control apparatus for controlling a motor that drives a wheel of a vehicle, the control software causing a computer to execute the following processing of:
measuring states of the vehicle;
calculating an estimated required power indicating a motor power required to operate the vehicle based on the state amount of the vehicle that is measured;
calculating a critical power when the motor power is saturated based on the measured states of the vehicle;
modifying a reference input so that the estimated required power falls within the estimated critical power when it is determined that the estimated required power that is estimated exceeds the estimated critical power that is estimated; and
controlling a motor of the vehicle based on the modified reference input.

15. A vehicle control apparatus for controlling a motor that drives a wheel of a vehicle, the vehicle control apparatus comprising:
a sensor for measuring states of the vehicle;
a required power estimation unit for calculating an estimated required power indicating a motor power required to operate the vehicle based on the state amount of the vehicle measured by the sensor;
a critical power estimation unit for calculating a critical power when the motor power saturates based on the state amount of the vehicle measured by the sensor;
a modified reference input unit for modifying a reference input so that the estimated required power falls within the estimated critical power when it is determined that the estimated required power estimated by the required power estimation unit exceeds the estimated critical power estimated by the critical power estimation unit; and
a control unit for controlling a motor of the vehicle based on the reference input modified by the modified reference input unit.

* * * * *